United States Patent [19]

Tanaka et al.

[11] Patent Number: 5,420,833
[45] Date of Patent: May 30, 1995

[54] MAGNETO-OPTICAL RECORDING MEDIUM HAVING FIRST AND SECOND MAGNETIC LAYERS

[75] Inventors: Motoharu Tanaka, Mishima; Atsuyuki Watada, Kawasaki; Masaetsu Takahashi; Hiroshi Deguchi, both of Yokohama; Toshiaki Tokita, Zama; Yoshiko Kurosawa, Yokohama, all of Japan

[73] Assignee: Ricoh Company, Ltd., Tokyo, Japan

[21] Appl. No.: 154,169

[22] Filed: Nov. 17, 1993

[30] Foreign Application Priority Data

Nov. 18, 1992 [JP] Japan .................................. 4-332413

[51] Int. Cl.⁶ .............................................. G11B 11/00
[52] U.S. Cl. ........................................ 369/13; 360/114; 428/694 ML
[58] Field of Search ...................... 369/13, 275.2, 288, 369/14, 275.3, 275.1; 360/59, 114, 131, 135; 365/122, 10, 27; 428/694 SC, 694 ML

[56] References Cited

U.S. PATENT DOCUMENTS

| | | |
|---|---|---|
| 5,132,945 | 7/1992 | Osato et al. .............. 369/13 |
| 5,233,575 | 8/1993 | Uchino et al. ............ 369/13 |
| 5,239,524 | 8/1993 | Sato et al. ............... 369/13 |
| 5,265,073 | 11/1993 | Osato ................... 360/59 X |

Primary Examiner—Georgia Y. Epps
Assistant Examiner—Ali Neyzari
Attorney, Agent, or Firm—Cooper & Dunham

[57] ABSTRACT

A magneto-optical recording medium is composed of a first magnetic layer and a second magnetic layer, which are overlaid, each having a perpendicular magnetic anisotropy, and the first magnetic layer having a Curie temperature of $Tc_1$, a saturation magnetization of $Ms_1$, a coercive force of $Hc_1$, and a thickness of $t_1$, the second magnetic layer having a compensation temperature of $Tcomp_2$, a Curie temperature $Tc_2$, and a coercive force of $Hc_2$, and which satisfies the relationships:

$$Troom < Tc_1 < Tcomp_2 < Tc_2$$

$$Hc_1 > Hc_2$$

$$Hc_1 > \sigma w/2Ms_1 t_1$$

wherein Troom is room temperature, and $\sigma w$ is the interface wall energy between the first magnetic wall and the second magnetic wall, and a magneto-optical recording method using this magneto-optical recording medium is provided, in which the application of a magnetic field for initialization of the magneto-optical recording medium is not required.

8 Claims, 3 Drawing Sheets

ERASING     RECORDING

MAGNETO-OPTICAL RECORDING MEDIUM HAVING FIRST AND SECOND MAGNETIC LAYERS

BACKGROUND OF THE INVENTION

1. Field of the Invention

The present invention relates to a magnetic-optical recording medium and a magneto-optical recording method.

2. Discussion of Background

Recently, magneto-optical recording media utilizing magneto-optical effects which can be used as rewritable optical recording media have been actively developed and some of them have been actually used in practice. Such magneto-optical recording media are expected to be usable as media for filing documents, video and still images, and as memory medium for computers because of the advantages over other recording media that high volume, high density recording, and non-contact recording and reproduction can be carried out with extremely easy access, and that overwriting is also possible.

There are several technical problems to be solved in order to develop a magneto-optical recording medium to a recording medium having a recording performance equivalent to or better than that of a magnetic disk.

One of the most important problems relates to the overwriting techniques. Currently proposed overwrite techniques can be classified into two categories in accordance with the recording methods thereof. One is a magnetic field modulation method, and the other is an optical modulation method (a multi-beam method, a two-film-layered method or the like).

The magnetic field modulation method is a method of carrying out recording by inverting the polarity of an applied magnetic field in accordance with the information to be recorded. In this method, since the polarity of the applied magnetic field has to be inverted at high speed, a floating type magnetic head is required, so that the replacement of the recording medium employed is difficult.

On the other hand, the optical modulation method is a method of carrying out recording by switching the application of a laser beam on or off or subjecting a laser beam to be applied to intensity modulation in accordance with the information to be recorded.

A multi-beam method which belongs to this optical modulation method is a pseudo-over-write method in which two to three laser beams are employed, and the direction of the magnetic field is inverted at every rotation of the recording medium so that recording and erasure are conducted for each track in the recording medium. This method, however, has the shortcomings that the apparatus for use in this method requires a complicated structure, and is costly.

A two-film-layered method which also belongs to the optical modulation method employs a magneto-optical recording medium with a two-film-layered recording layer by which overwriting is carried out.

An example of the two-film-layered method is disclosed in Japanese Laid-Open Patent Application 62-175948. The two-film-layered method disclosed in the above Japanese Laid-Open Patent Application employs a magneto-optical recording medium provided with a two-film-layered recording layer which is composed of a memory layer comprising TbFe and an auxiliary layer comprising TbFeCo. In this method, the above magneto-optical recording medium is initialized, and then overwriting is carried out by the application of an external magnetic field and laser beams with different powers to the recording medium.

More specifically, in this method, prior to recording, the auxiliary layer is magnetized in a predetermined one direction by the application of a magnetic field for initialization, the temperature (T) of the recording medium is raised to a temperature $Tc_2$ which is the Curie temperature of the auxiliary layer, that is, in the relationship of $T > Tc_2$, by the application of a high-power-output laser beam, so that the magnetization of the auxiliary layer is inverted by the application of a magnetic field for recording, which has a magnetization direction opposite to that of the magnetic field for initialization, and the magnetization of the auxiliary layer is transferred to a memory layer of the recording medium when the recording medium is cooled, whereby recording is carried out. Recorded information is erased by raising the temperature (T) of the recording medium to a temperature in the relationship of $Tc_1 < T < Tc_2$, wherein $Tc_1$ is the Curie temperature of the memory layer, and the magnetization direction of the auxiliary layer is transferred to the memory layer. Because of the above steps for recording and erasing, the above-method requires a magnet for initialization.

SUMMARY OF THE INVENTION

It is therefore a first object of the present invention to provide a magneto-optical recording medium which is capable of performing overwriting with high reliability without the application of a magnetic field for initialization to the recording medium, and has excellent reproduction characteristics.

A second object of the present invention is to provide a magneto-optical recording method using the above-mentioned magneto-optical recording medium, which is capable of performing overwriting with high reliability without the application of a magnetic field for the initialization of the recording medium.

The first object of the present invention can be achieved by a magneto-optical recording medium which comprises a first magnetic layer and a second magnetic layer, which are overlaid, each having a perpendicular magnetic anisotropy, and the first magnetic layer having a Curie temperature of $Tc_1$, a saturation magnetization of $Ms_1$, a coercive force of $Hc_1$, and a thickness of $t_1$, the second magnetic layer having a compensation temperature of $Tcomp_2$, a Curie temperature of $Tc_2$, and a coercive force of $Hc_2$, and which satisfies the relationships (1) to (3):

$$Troom < Tc_1 < Tcomp_2 < Tc_2 \quad (1)$$

$$Hc_1 > Hc_2 \quad (2)$$

$$Hc_1 > \sigma w / 2Ms_1 t_1 \quad (3)$$

wherein Troom is room temperature, and $\sigma w$ is the interface wall energy between the first magnetic layer and the second magnetic layer.

According to the present invention, an intermediate layer which is capable of adjusting the exchange coupling force between the first magnetic layer and the second magnetic layer may be interposed between the first magnetic layer and the second magnetic layer.

According to the present invention, each of the first magnetic layer and the second magnetic layer may comprise an amorphous magnetic film of the formula:

$$[(RE1)_{1-z}(RE2)_z]_x(Fe_{1-y}Co_y)_{1-x}$$

wherein RE1 is at least one heavy rare earth element selected from the group consisting of Tb, Gd, Dy, Ho and Er, and RE2 is at least one light rare earth element selected from the group consisting of Ce, Pr, Nd, Pm, Sm and Eu, and $0.15 \leq x \leq 0.35$, $0 \leq y \leq 0.4$, $0 \leq z \leq 0.5$.

The magneto-optical recording medium of the present invention may further comprises a reproduction layer, which is provided adjacent to the first magnetic layer on a light-incident side thereof, comprises an amorphous magnetic layer of the following formula, having perpendicular magnetic anisotropy, a coercive force smaller than that of the first magnetic layer, and a Curie temperature higher than that of the first magnetic layer:

$$[(RE3)_{1-c}(RE4)_c]_a(Fe_{1-b}Co_b)_{1-a}$$

wherein RE3 is at least one heavy rare earth element selected from the group consisting of Tb, Gd, Dy, Ho and Er, RE4 is at least one light rare earth element selected from the group consisting of Ce, Pr, Nd, Pm, Sm and Eu, and $0.15 \leq a \leq 0.35$, $0 \leq b \leq 0.4$, $0 \leq c \leq 0.5$.

Furthermore, the magneto-optical recording medium of the present invention may further comprise a heat transfer conductive layer which is provided adjacent to the second magnetic layer on the side opposite to a light-incident side thereof.

The second object of the present invention can be achieved by a magneto-optical recording method using the above-mentioned magneto-optical recording medium of the present invention, which comprises the step of erasing information recorded in the magneto-optical recording medium by raising the temperature thereof to a temperature near the Curie temperature $TC_1$, and the step of recording information in the magneto-optical recording medium by raising the temperature thereof to a temperature near the Curie temperature $TC_2$, without the application of a magnetic field for initialization of the magneto-optical recording medium.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
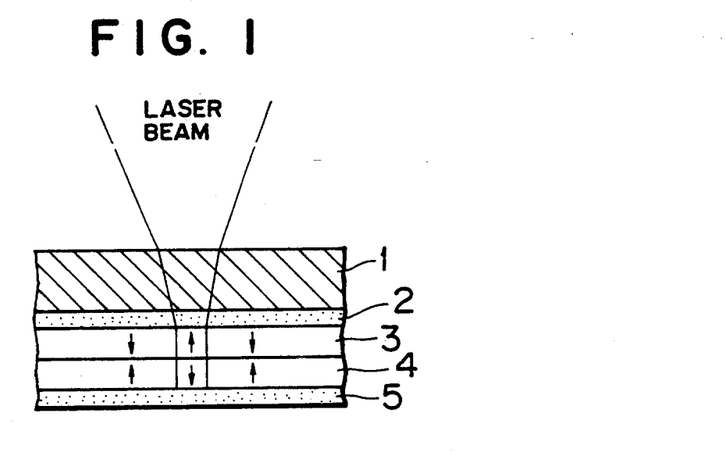
FIG. 1 is a schematic cross-sectional view of an example of a magneto-optical recording medium according to the present invention, which comprises a first magnetic layer 3 and a second magnetic layer 4 which are overlaid on a substrate 1 via a protective layer 2, and a protective layer 5 provided on the second magnetic layer 4.

FIG. 1 is a schematic cross-sectional view of an example of a magneto-optical recording medium of the present invention. In this example, a protective layer 2 composed of $SiO_2$, SiO, $Si_3N_4$, AlN, or the like, with a thickness of 100 to 5000 Å, is provided on a transparent substrate 1, which is composed of glass, plastics, ceramics or the like. On the protective layer 2, a first magnetic layer 3 comprising an amorphous magnetic film having a perpendicular magnetic anisotropy, and a second magnetic layer 4 comprising an amorphous magnetic film having a perpendicular magnetic anisotropy are successively overlaid. Furthermore, a protective layer 5 composed of $SiO_2$, SiO, $Si_3N_4$, AlN, or the like, with a thickness of 100 to 5000 Å, is provided on the second magnetic layer 4.

Each of the above layers can be provided, for instance, by the sputtering method, the vacuum deposition method, or the ion-plating method.

As the material for the first magnetic layer 3, a rare earth-transition metal amorphous alloy of the following formula (I) is preferably employed:

$$[(RE1)_{1-z}(RE2)_z]_x(Fe_{1-y}Co_y)_{1-x} \quad (I)$$

wherein RE1 is at least one heavy rare earth element selected from the group consisting of Tb, Gd, Dy, Ho and Er, and RE2 is at least one light rare earth element selected from the group consisting of Ce, Pr, Nd, Pm, Sm and Eu, and $0.15 \leq x \leq 0.35$, $0 \leq y \leq 0.4$, $0 \leq z \leq 0.5$.

More specifically, alloys such as Tb-Fe, Gd-Fe, Gd-Tb-Fe, Tb-Dy-Fe, Gd-Dy-Fe, Tb-Fe-Co, Gd-Fe-Co, Dy-Fe-Co, Tb-Dy-Fe-Co, Gd-Tb-Fe-Co, Gd-Dy-Fe-Co, Tb-Ho-Fe-Co, and Tb-Er-Fe-Co, which satisfy the above-mentioned conditions, and alloys composed of any of the above alloys and at least one light rare earth element selected from the group consisting of Ce, Pr, Nd, Pm, Sm and Eu, can be employed.

When an alloy containing any of the above-mentioned light rare earth elements is used in the first magnetic layer 3, the magneto-optical recording medium has an advantage that the lowering of the reproduction performance of the recording medium when a short wavelength light source is employed for reproduction can be decreased. It is preferable that thickness ($t_1$) of the first magnetic layer 3 be in the range of 100 to 2000 Å.

As for the material for the second magnetic layer 4, the same rare earth-transition metal amorphous alloy as that employed in the first magnetic layer, having the following formula (I), is preferably employed:

$$[(RE1)_{1-z}(RE2)_z]_x(Fe_{1-y}Co_y)_{1-x} \quad (I)$$

wherein RE1 is at least one heavy rare earth element selected from the group consisting of Tb, Gd, Dy, Ho and Er, and RE2 is at least one light rare earth element selected from the group consisting of Ce, Pr, Nd, Pm, Sm and Eu, and $0.15 \leq x \leq 0.35$, $0 \leq y \leq 0.4$, $0 \leq z \leq 0.5$.

More specifically, alloys such as Tb-Fe, Gd-Fe, Gd-Tb-Fe, Tb-Dy-Fe, Gd-Dy-Fe, Tb-Fe-Co, Gd-Fe-Co, Dy-Fe-Co, Tb-Dy-Fe-Co, Gd-Tb-Fe-Co, Gd-Dy-Fe-Co, Tb-Ho-Fe-Co, and Tb-Er-Fe-Co, which satisfy the above-mentioned conditions, and alloys composed of any of the above alloys and at least one light rare earth element selected from the group consisting of Ce, Pr, Nd, Pm, Sm and Eu, can be employed.

When an alloy containing any of the above-mentioned light rare earth elements is used in the second magnetic layer 4, the magneto-optical recording medium has an advantage that the lowering of the reproduction performance of the recording medium when a short wavelength light source is employed for reproduction can be decreased. It is preferable that thickness ($t_2$) of the second magnetic layer 4 be in the range of 100 to 3000 Å.

When the first magnetic layer 3 has a Curie temperature of $Tc_1$, a saturation magnetization of $Ms_1$, a coercive force of $Hc_1$, and a thickness of $t_1$, and the second magnetic layer 4 has a compensation temperature of $Tcomp_2$, a Curie temperature of $Tc_2$, and a coercive force of $Hc_2$, it is required that the first magnetic layer 3 and the second magnetic layer 4 satisfy the following conditions:

$$Troom < Tc_1 < Tcomp_2 < Tc_2 \quad (1)$$

$$Hc_1 > Hc_2 \quad (2)$$

$$Hc_1 > \sigma w/2Ms_1 t_1 \quad (3)$$

wherein Troom is room temperature, and $\sigma w$ is the interface wall energy between the first magnetic layer 3 and the second magnetic layer 4.

With respect to the above condition (1), in order to conduct magnetic transfer from the second magnetic layer 4 to the first magnetic layer 3 to have the first magnetic layer 3 memorize the magnetization of the second magnetic layer 4, it is required that $Tc_2$ be higher than $Tc_1$, and as a matter of course, both $Tc_1$ and $Tc_2$ be higher than Troom. Furthermore, in order to conduct recording and erasing by the application of only a recording bias magnetic field, it is required that $Tcomp_2$ be higher than $Tc_1$, and lower than $Tc_2$. It is preferable that $Tc_1$ be in the range of 80° C. to 240° C., and $Tc_2$ be in the range of 140° C. to 300° C.

With respect to the above conditions (2) and (3), when $Hc_1 \leq Hc_2$, the magnetization of the first magnetic layer 3 is magnetically inverted by the bias magnetic field or by an external magnetic filed. Therefore, $Hc_1$ must be larger than $Hc_2$ ($Hc_1 \leq Hc_2$). Furthermore, it is required that the above-mentioned condition (3) be satisfied for $Hc_1$ in order that the magnetization of the first magnetic layer 3 at room temperature Troom not be directed in the magnetization direction of the second magnetic layer 4 by the exchange coupling force between the two magnetic layers 3 and 4.

It is preferable that $Hc_1$ be in the range of 4 to 15 KOe, and $Hc_2$ be in the range of 0.2 to 3 KOe. It is preferable that $Ms_1$ be in the range of 10 to 150 emu/cc, and $Ms_2$ be in the range of 100 to 250 emu/cc.

In the recording layer comprising the above first magnetic layer 3 and the second magnetic layer 4 which satisfy the above-mentioned conditions (1) to (3), the magnetization direction of the second magnetic layer 4 can be changed depending upon the temperature of the applied laser beam by using a recording bias magnetic field only, and the magnetization can be transferred to the first magnetic layer 3 by the exchange coupling force between the first magnetic layer 3 and the second magnetic layer 4, so that overwriting can be carried out without the application of a magnetic field for initialization.

Figure 2:
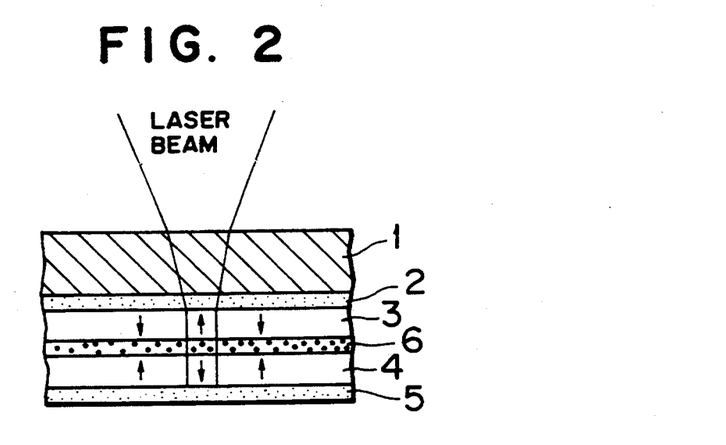
FIG. 2 is a schematic cross-sectional view of another example of a magneto-optical recording medium according to the present invention, which is the same as shown in FIG. 1 except that an intermediate layer 6 is provided between the first magnetic layer 3 and the second magnetic layer 4.

In the above mentioned example, the recording layer is composed of the two overlaid magnetic layers. According to the present invention, however, an intermediate layer 6 can be interposed between the first magnetic layer 3 and the second magnetic layer 4 in order to control the exchange coupling force between the first magnetic layer 3 and the second magnetic layer 4 as shown in FIG. 2.

As the material for the intermediate layer 6, a material which does not cause the first and second magnetic layers 3, 4 to deteriorate, and is a non-magnetic material having a small perpendicular magnetic anisotropy is preferably employed.

Specific examples of the material for the intermediate layer 6 are rare earth metal-transition metal amorphous magnetic films, Si, Al, Ag, Au, Cu, Fe, Co, Ni, Cr, Si-N, Al-N, Fe-N, SiO, $SiO_2$, Fe-Co, Gd, Tb, Dy, Nd.

It is preferable that the intermediate layer 6 have a thickness of about several Å to 500 Å. This is because when the intermediate layer 6 is much thinner than the above thickness, it is not easy to obtain the effect of adjusting the exchange coupling force between the first magnetic layer 3 and the second magnetic layer 4, while when the intermediate layer 6 is much thicker than the above thickness, the exchange coupling force between the first magnetic layer 3 and the second magnetic layer 4 becomes too small to perform the recording and erasing operations properly.

The intermediate layer 6 can be provided by the sputtering method, the vacuum deposition method, the ion-plating method, or the like.

Figure 3:
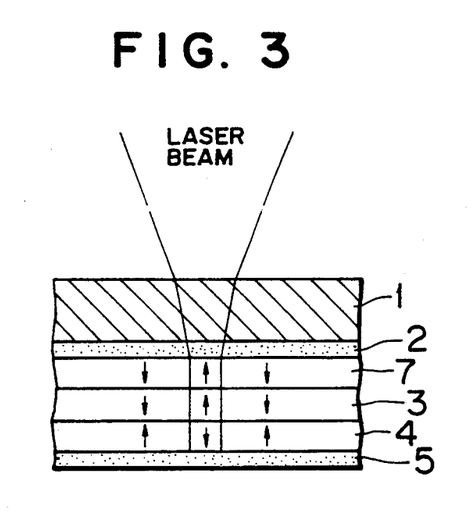
FIG. 3 is a schematic cross-sectional view of a further example of a magneto-optical recording medium of the present invention, which is the same as shown in FIG. 1 except that a reproduction layer 7 is provided adjacent to the first magnetic layer 3 on a light-incident side thereof.

According to the present invention, a reproduction layer 7 comprising an amorphous magnetic film having a perpendicular magnetic anisotropy, a coercive force Hc which is smaller than that of the first magnetic layer 3, and a Curie temperature Tc which is higher than that of the first magnetic layer 3, can be provided adjacent to the first magnetic layer 3 on a light-incident side thereof as shown in FIG. 3.

As the material for the reproduction layer 7, it is preferable to employ a rare earth element-transition metal amorphous alloy, having a large magneto-optical effect, of the following formula (II):

$$[(RE3)_{1-c}(RE4)_c]_a(Fe_{1-b}Co_b)_{1-a} \quad (II)$$

wherein RE3 is at least one heavy rare earth element selected from the group consisting of Tb, Gd, Dy, Ho and Er, RE4 is at least one light rare earth element selected from the group consisting of Ce, Pr, Nd, Pm, Sm and Eu, and $0.15 \leq a \leq 0.35$, $0 \leq b \leq 0.4$, $0 \leq c \leq 0.5$.

More specifically, alloys such as Tb-Fe, Gd-Fe, Gd-Tb-Fe, Tb-Dy-Fe, Gd-Dy-Fe, Tb-Fe-Co, Gd-Fe-Co, Dy-Fe-Co, Tb-Dy-Fe-Co, Gd-Tb-Fe-Co, Gd-Dy-Fe-Co, Tb-Ho-Fe-Co, Tb-Er-Fe-Co, and alloys composed of any of the above alloys and at least one light rare earth element selected from the group consisting of Ce, Pr, Nd, Pm, Sm and Eu, can be employed.

It is necessary that the reproduction layer 7 be so thin as to allow light to pass therethrough. It is preferable that the thickness of the reproduction layer 7 be 600 Å or less. The reproduction layer 7 can be provided by the sputtering method, the vacuum deposition method, the ion-plating method, or the like.

The reproduction layer 7 has a function of improving the reproduction properties of the magneto-optical recording medium. It is required that the coercive force $Hc_3$ of the reproduction layer be smaller than the coercive force $Hc_1$ of the first magnetic layer 3, that is, $Hc_3 < Hc_1$, because the magnetization of the reproduction layer 7 must be in such a state that the magnetized information in the first magnetic layer 3 is transferred to the reproduction layer 7. It is preferable that the coercive force $Hc_3$ of the reproduction layer 7 be in the range of 0.1 to 2 KOe. If the magnetized information in the reproduction layer 7 is removed therefrom before the magnetized information in the first magnetic layer 3 is removed therefrom, a reading error is caused to take place. Therefore, it is required that the Curie temperature $Tc_3$ of the reproduction layer 7 satisfy the condition of $Tc_3 > Tc_1$. It is preferable that $Tc_3$ be in the range of 120° C. to 300° C.

The magnetized information transferred to the reproduction layer 7 is read out by utilizing the magneto-optical effect using a laser beam for reproduction.

The reproduction layer 7 is composed of a material having a large magneto-optical effect and is so thin (600 Å or less) that light can pass through the reproduction layer 7 and not only the Kerr effect, but also the Faraday effect of the reproduction layer 7 can be utilized. As a result, the magneto-optical effect of the recording medium is enhanced, and the reproduction characteristics of the recording medium can be improved.

Figure 4:
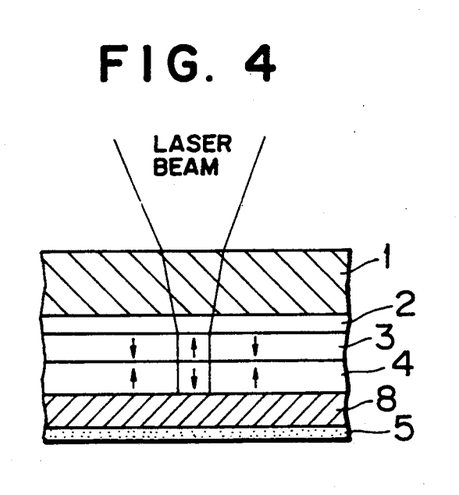
FIG. 4 is a schematic cross-sectional view of still another example of a magneto-optical recording medium of the present invention, which is the same as shown in FIG. 1 except that a heat transfer layer 8 is provided adjacent to the second magnetic layer 4 on the side opposite to the light-incident side thereof.

According to the present invention, a heat conductive layer 8 can be provided adjacent to the second magnetic layer 4 on the side opposite to the light-incident side thereof as illustrated in FIG. 4. The heat conductive layer 8 serves to minimize the heat transfer in the transverse direction of the recording medium, and to make the shapes of magnetic domains for recording uniform, whereby the reproduction characteristics of the recording medium can be improved.

As the materials for the heat conductive layer 8, for instance, Al, Cu, Au, Ag, Pt, Sic, and AlN can be employed.

It is preferable that the thickness of the heat conductive layer 8 be in the range of 100 Å to 3000 Å. The heat conductive layer 8 can be provided by a conventional method, such as the sputtering method, the vacuum deposition method, and the ion-plating method.

In the magneto-optical recording medium constructed as illustrated in FIG. 4, which includes the above-mentioned heat conductive layer 8, the heat conductive layer 8 serves as a heat sink, so that the spreading of heat in the transverse direction of the recording medium can be minimized. As a result, the problems that the shape of the leading edge of each magnetic domain for recording differs from that of the rear edge thereof, and that each magnetic domain for recording is elongated in comparison with the corresponding actual recording pattern can be obviated, so that uniform magnetic domains can be formed and the reproduction characteristics of the recording medium can be improved. Furthermore, minute magnetic domains for recording can be formed because of the minimized heat spreading in the transverse direction, so that high density recording can be achieved.

The magneto-optical recording method of the present invention will now be explained.

In the magneto-optical recording method of the present invention, a bias magnetic field Hb which satisfies the following condition is applied to the magneto-optical recording medium of the present invention in the step of increasing the temperature of the recording medium to a temperature near $Tc_1$, and recording and erasing are conducted by varying only the power of a laser beam to be applied, without the application of a magnetic field for initialization:

$$Hc_1 \pm \sigma w/2Ms_1t_1 > Hb > Hc_2 + \sigma w/2Ms_2t_2 \tag{4}$$

The above-mentioned bias magnetic field Hb is also used for the initialization of the second magnetic layer 4 in the step of increasing the temperature up to a temperature near $Tc_1$.

Figure 5A:
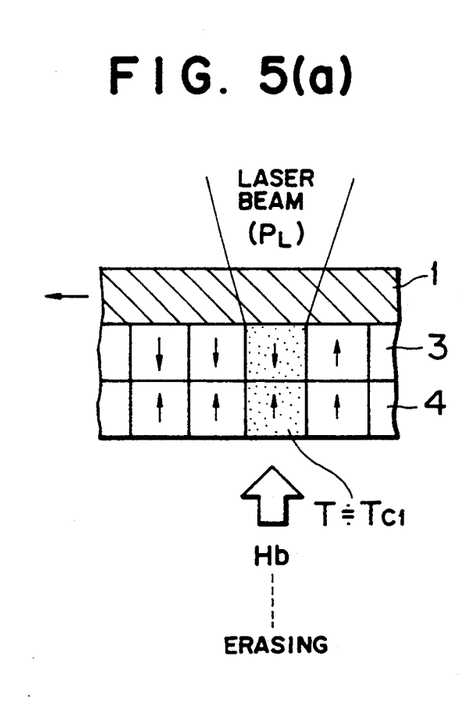
FIG. 5(a) is a diagram in explanation of a recording process in a magneto-optical recording method of the present invention.
Figure 5B:
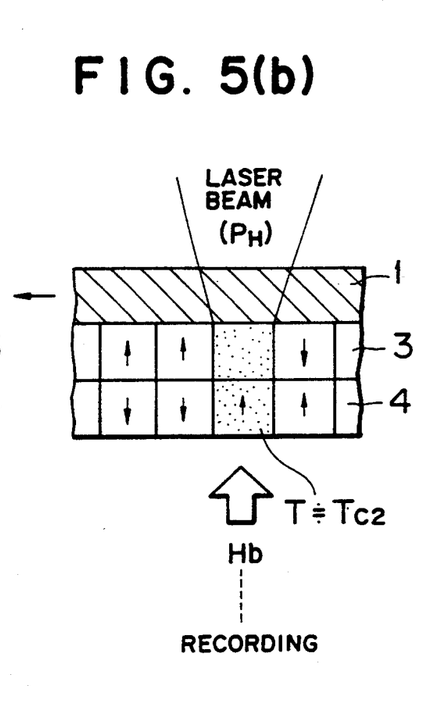
FIG. 5(b) is a diagram in explanation of an erasing process in the magneto-optical recording method of the present invention.

FIGS. 5(a) and 5(b) are diagrams for explaining the recording and erasing processes according to the magneto-optical recording method of the present invention.

The erasing by the magneto-optical recording method of the present invention is conducted by applying a laser beam with a low power (PL) to the recording medium of the present invention, thereby raising the temperature (T) of the recording medium to a temperature near $Tc_1$, that is, $Tc_1 - 20 \leq T \leq Tc_1 + 20$ [°C.]).

Before the above-mentioned application of the laser beam, the magnetization of the first magnetic layer 3 is directed in the direction previously set, and the magnetization of the second magnetic layer 4 is directed in such a direction that the second magnetic layer 4 is stable in terms of energy by the exchange coupling force caused by the magnetization of the first magnetic layer 3.

When a laser beam is applied to the recording medium in the above-mentioned state, the magnetization of the second magnetic layer 4 is directed in the direction of the bias magnetic field Hb during the heat elevation process by the application of the laser beam. Since the $Hc_2$ of the second magnetic layer 4 becomes so large at a temperature near $Tc_1$ that the magnetization of the second magnetic layer 4 is fixed. At this moment, the magnetization of the first magnetic layer 3 is gradually decreased and becomes zero at $Tc_1$. Thereafter, the application of the laser beam is terminated, and the magnetization of the second magnetic layer 4 is magnetically transferred to the first magnetic layer 3 by the exchange coupling force between the first magnetic layer 3 and the second magnetic layer 4 in the course of the decreasing of the temperature of the recording medium. When the temperature of the recording medium returns to room temperature, the magnetization transfer of the first magnetic layer 3 is fixed because the coercive force $Hc_1$ thereof is extremely large. On the other hand, the coercive force $Hc_2$ of the second magnetic layer 4 is so small that the magnetization of the second magnetic layer 4 is directed in such a direction that the second magnetic layer 4 is stable in terms of energy by the exchange coupling force caused by the magnetization of the first magnetic layer 3.

The recording by the magneto-optical recording method of the present invention is conducted by the application of a laser beam with a high power (PH) to the recording medium of the present invention, thereby raising the temperature (T) of the recording medium up to a temperature near $Tc_2$, that is, ($Tc_2-20 \leq T \leq Tc_2+20$ [°C.]). When the temperature (T) of the recording medium is raised to a temperature near $Tc_2$, the magnetization of the first magnetic layer 3 becomes zero, and the magnetization of the second magnetic layer 4 draws near zero, so that the magnetization of the second magnetic layer 4 is magnetically inverted in the direction of the bias magnetic field Hb, that is, recording is conducted, and the recording is fixed in the course of the cooling step. When the temperature of the recording medium is decreased via $Tcomp_2$, since the sub-lattice magnetization of the recording layer changes from a TM-dominant state to a RE-dominant state, the overall magnetization of the second magnetic layer 4 is again inverted. When the temperature of the recording medium is further decreased and reaches a temperature near $Tc_1$, the magnetization of the second magnetic layer 4 is magnetically transferred to the first magnetic layer 3 by the exchange coupling force, and the magnetization of the first magnetic layer 3 is fixed at room temperature Troom. The magnetization of the second magnetic force 4 is directed in such a direction that the second magnetic layer 4 is stable in term of energy by the exchange coupling force with the first magnetic layer 3 at a temperature near room temperature Troom.

Thus, according to the magneto-optical recording method of the present invention, recording and erasing can be carried out without the application of a magnetic field for initialization, and there is not formed a state in which interface walls between the first magnetic layer 3 and the second magnetic layer 4 are present at room temperature, so that the magnetic domains for recording have excellent stability.

The features of the present invention will become apparent in the course of the following description of exemplary embodiments, which are given for illustration of the invention and are not intended to be limiting thereof.

EXAMPLE 1

The following layers were successively overlaid on a polycarbonate disk with a diameter of 130 mm serving as a substrate in vacuum by the rf magnetron sputtering method, whereby a magneto-optical recording medium No. 1 of the present invention was fabricated:

| | |
|---|---|
| Protective Layer 2: | $Si_3N_4$ (800 Å) |
| 1st Magnetic Layer 3: | $Tb_{0.21}(Fe_{0.9}Co_{0.1})_{0.79}$ (500 Å) |
| 2nd Magnetic Layer 4: | $(Gd_{0.9}Tb_{0.1})_{0.28}(Fe_{0.85}Co_{0.15})_{0.72}$ (1500 Å) |
| Protective Layer 5: | $Si_3N_4$ (500 Å) |

The following Table 1 shows the magnetic characteristics of the magneto-optical recording medium No. 1 of the present invention:

TABLE 1

| | Ms (emu/cc) | Hc(KOe) | Tcomp(°C.) | Tc(°C.) |
|---|---|---|---|---|
| First Magnetic Layer | 34 | 10.2 | — | 180 |
| Second Magnetic Layer | 132 | 0.6 | 200 | 280 |

TABLE 1-continued

| | Ms (emu/cc) | Hc(KOe) | Tcomp(°C.) | Tc(°C.) |
|---|---|---|---|---|
| Layer | | | | |

The value of $\sigma w$ of the magneto-optical recording medium No. 1 of the present invention was 1.4 erg/cm$^2$, and the value of $\sigma w/2Ms_1t_1$ was 4.1 KOe.

COMPARATIVE EXAMPLE 1

The following layers were successively overlaid on a polycarbonate disk with a diameter of 130 mm serving as a substrate in vacuum by the rf magnetron sputtering method, whereby a comparative magneto-optical recording medium No. 1 was fabricated:

| | |
|---|---|
| Protective Layer 2: | $Si_3N_4$ (800 Å) |
| 1st Magnetic Layer 3: | $Tb_{0.21}(Fe_{0.9}Co_{0.1})_{0.79}$ (500 Å) |
| 2nd Magnetic Layer 4: | $(Gd_{0.5}Tb_{0.5})_{0.19}(Fe_{0.85}Co_{0.15})_{0.81}$ (1500 Å) |
| Protective Layer 5: | $Si_3N_4$ (500 Å) |

The following Table 2 shows the magnetic characteristics of the comparative magneto-optical recording medium No. 1:

TABLE 2

| | Ms (emu/cc) | Hc(KOe) | Tcomp(°C.) | Tc(°C.) |
|---|---|---|---|---|
| First Magnetic Layer | 34 | 10.2 | — | 180 |
| Second Magnetic Layer | 170 | 2 | — | 260 |

The value of $\sigma w$ of the comparative magneto-optical recording medium No. 1 was 1.5 erg/cm$^2$, and the value of $\sigma w/2Ms_1t_1$ was 4.4 KOe.

Overwriting was conducted on each of the magneto-optical recording medium No. 1 of the present invention and the comparative magneto-optical recording medium No. 1 under the following conditions, with the application of a magnetic field for initialization to the comparative magneto-optical recording medium No. 1, and without the application of a magnetic field for initialization to the magneto-optical recording medium No. 1 of the present invention, whereby the overwriting performances of the two magneto-optical media were compared:

| | |
|---|---|
| Laser power at recording; | 12 mW |
| Laser power at erasing: | 6 mW |
| Laser power at reproduction: | 1 mW |
| Line speed: | 7 m/s |

With respect to the bias magnetic field Hb, a magnetic field of 0.8 Koe which satisfied the previously mentioned formula (4) was applied in such a direction as shown in FIGS. 5(a) and 5(b). Furthermore, the temperature of each of the recording media was raised to about 300° C. by the application of a laser beam with the power of 12 mW, and the temperature of each of the recording media was raised to about 180° C. by the application of a laser beam with the power of 6 mW.

The following Table 3 shows the C/N value when 1 MHz signals were recorded and reproduced under the above-mentioned conditions on each of the two recording media, and the C/N value obtained when 2 MHz overwriting was performed on each recording medium:

TABLE 3

|  | C/N (Before Overwriting) | C/N (After Overwriting) |
|---|---|---|
| Example 1 | 47dB | 46dB |
| Comparative Example 1 | 47dB | 46dB |

The above results indicate that the magneto-optical recording medium No. 1 of the present invention prepared in Example 1, without the application of a magnetic field for initialization, exhibited the same overwriting performance as that of the comparative magneto-optical recording medium No. 1 to which the magnetic field of 4 Koe for initialization was applied.

Overwriting by the comparative magneto-optical recording medium No. 1 was impossible when the magnetic field for initialization was not applied thereto.

EXAMPLE 2

The following layers were successively overlaid on a polycarbonate disk with a diameter of 130 mm serving as a substrate in vacuum by the rf magnetron sputtering method, whereby a magneto-optical recording medium No. 2 of the present invention was fabricated:

| Protective Layer 2: | $Si_3N_4$ (800 Å) |
|---|---|
| 1st Magnetic Layer 3: | $Tb_{0.21}(Fe_{0.9}Co_{0.1})_{0.79}$ (500 Å) |
| Intermediate Layer 6: | $Gd_{0.35}(Fe_{0.83}Co_{0.15})_{0.65}$ (50 Å) |
| 2nd Magnetic Layer 4: | $(Gd_{0.9}Tb_{0.1})_{0.28}(Fe_{0.83}Co_{0.15})_{0.72}$ (1500 Å) |
| Protective Layer 5: | $Si_3N_4$ (500 Å) |

The magnetic characteristics of the above first magnetic layer and second magnetic layer were the same as those of the first magnetic layer and second magnetic layer of the magneto-optical recording medium No. 1 fabricated in Example 1.

Overwriting was conducted on the above magneto-optical recording medium No. 2 of the present invention, without the application of any magnetic field for initialization thereto under the following conditions:

| Laser power at recording; | 12 mW |
|---|---|
| Laser power at erasing; | 6 mW |
| Laser power at reproduction; | 1 mW |
| Line speed: | 7 m/s |

With respect to the bias magnetic field Hb, a magnetic field of 0.7 Koe which satisfied the previously mentioned formula (4) was applied in such a direction as shown in FIGS. 5(a) and 5(b).

The following Table 4 shows the C/N value when 1 MHz signals were recorded and reproduced under the above-mentioned conditions on the above recording medium, and the C/N value obtained when 2 MHz overwriting was performed on the recording medium:

TABLE 4

|  | C/N (Before Overwriting) | C/N (After Overwriting) |
|---|---|---|
| Example 2 | 47dB | 47dB |

The above results indicate that when the intermediate layer was interposed between the first magnetic layer and the second magnetic layer, the overwriting performance was improved in comparison with that of the magneto-optical recording medium No. 1 of the present invention fabricated in Example 1, which did not include such an intermediate layer.

EXAMPLE 3

The following layers were successively overlaid on a polycarbonate disk with a diameter of 130 mm serving as a substrate in vacuum by the rf magnetron sputtering method, whereby a magneto-optical recording medium No. 3 of the present invention was fabricated:

| Protective Layer 2: | $Si_3N_4$ (800 Å) |
|---|---|
| 1st Magnetic Layer 3: | $(Nd_{0.2}Tb_{0.8})_{0.22}(Fe_{0.9}Co_{0.1})_{0.78}$ (500 Å) |
| 2nd Magnetic Layer 4: | $(Gd_{0.9}Tb_{0.1})_{0.28}(Fe_{0.85}Co_{0.15})_{0.72}$ (1500 Å) |
| Protective Layer 5: | $Si_3N_4$ (500 Å) |

The magnetic properties of the first magnetic layer and the second magnetic layer of the magneto-optical recording medium No. 3 of the present invention were as shown in the following Table 5:

TABLE 5

|  | Ms (emu/cc) | Hc(KOe) | Tcomp(°C.) | Tc(°C.) |
|---|---|---|---|---|
| First Magnetic Layer | 42 | 9.6 | — | 180 |
| Second Magnetic Layer | 132 | 0.6 | 200 | 280 |

Overwriting was conducted on the above magneto-optical recording medium No. 3 of the present invention, without the application of any magnetic field for initialization thereto under the following conditions:

| Laser power at recording: | 12 mW |
|---|---|
| Laser power at erasing: | 6 mW |
| Laser power at reproduction: | 1 mW |
| Line speed: | 7 m/s |

With respect to the bias magnetic field Hb, a magnetic field of 0.8 Koe which satisfied the previously mentioned formula (4) was applied in such a direction as shown in FIGS. 5(a) and 5(b).

The following Table 6 shows the C/N value when 1 MHz signals were recorded and reproduced under the above-mentioned conditions on the above recording medium, and the C/N value obtained when 2 MHz overwriting was performed on the recording medium:

TABLE 6

|  | C/N (Before Overwriting) | C/N (After Overwriting) |
|---|---|---|
| Example 3 | 47dB | 46dB |

The above results indicate that even when the light rare earth element Nd was contained in the first magnetic layer, the same overwriting performance as that of the magneto-optical recording medium No. 1 of the present invention fabricated in Example 1 was obtained.

When such a light rare earth element as used in this example is employed, the decrease in the magneto-optical effect is advantageously small even if the wavelength of the laser beam applied thereto is shortened.

EXAMPLE 4

The following layers were successively overlaid on a polycarbonate disk with a diameter of 130 mm serving as a substrate in vacuum by the rf magnetron sputtering method, whereby a magneto-optical recording medium No. 4 of the present invention was fabricated:

Protective Layer 2: $Si_3N_4$ (800 Å)
Reproduction Layer 7: $(Gd_{0.5}Tb_{0.5})_{0.22}(Fe_{0.9}Co_{0.1})_{0.78}$ (300 Å)
1st Magnetic Layer 3: $Tb_{0.21}(Fe_{0.9}Co_{0.1})_{0.79}$ (500 Å)
2nd Magnetic Layer 4: $(Gd_{0.9}Tb_{0.1})_{0.28}(Fe_{0.85}Co_{0.15})_{0.72}$ (1500 Å)
Protective Layer 5: $Si_3N_4$ (500 Å)

The magnetic characteristics of the reproduction layer, the first magnetic layer, and the second magnetic layer of this magneto-optical recording medium were as follows:

TABLE 7

|  | Ms(emu/cc) | Hc(KOe) | Tcomp(°C.) | Tc(°C.) |
|---|---|---|---|---|
| Reproduction Layer | 192 | 1.2 | — | 230 |
| First Magnetic Layer | 34 | 10.2 | — | 180 |
| Second Magnetic Layer | 132 | 0.6 | 200 | 280 |

Overwriting was conducted on the above magneto-optical recording medium No. 4 of the present invention, without the application of any magnetic field for initialization thereto under the following conditions:

| Laser power at recording: | 12 mW |
|---|---|
| Laser power at erasing: | 6 mW |
| Laser power at reproduction: | 1 mW |
| Line speed: | 7 m/s |

With respect to the bias magnetic field Hb, a magnetic field of 0.8 Koe which satisfied the previously mentioned formula (4) was applied in such a direction as shown in FIGS. 5(a) and 5(b).

The following Table 8 shows the C/N value when 1 MHz signals were recorded and reproduced under the above-mentioned conditions on the above recording medium, and the C/N value obtained when 2 MHz overwriting was performed on the recording medium:

TABLE 8

|  | C/N (Before Overwriting) | C/N (After Overwriting) |
|---|---|---|
| Example 4 | 49dB | 48dB |

The above results indicate that the above fabricated magneto-optical recording medium No. 4 including the reproduction layer has a much better reproduction C/N value and a better overwriting performance than those of any of the magneto-optical recording media No. 1 to No. 3 fabricated in Examples 1 to 3.

EXAMPLE 5

The following layers were successively overlaid on a polycarbonate disk with a diameter of 130 mm serving as a substrate in vacuum by the rf magnetron sputtering method, whereby a magneto-optical recording medium No. 5 of the present invention was fabricated:

Protective Layer 2: $Si_3N_4$ (800 Å)
Reproduction Layer 7: $(Nd_{0.2}Gd_{0.4}Tb_{0.4})_{0.23}(Fe_{0.9}Co_{0.1})_{0.77}$ (300 Å)
1st Magnetic Layer 3: $Tb_{0.21}(Fe_{0.9}Co_{0.1})_{0.79}$ (500 Å)
2nd Magnetic Layer 4: $(Gd_{0.9}Tb_{0.1})_{3.28}(Fe_{0.85}Co_{0.15})_{0.72}$ (1500 Å)
Protective Layer 5: $Si_3N_4$ (500 Å)

The magnetic characteristics of the reproduction layer, the first magnetic layer, and the second magnetic layer of this magneto-optical recording medium were as shown in the following Table 9:

TABLE 9

|  | Ms(emu/cc) | Hc(KOe) | Tcomp(°C.) | Tc(°C.) |
|---|---|---|---|---|
| Reproduction Layer | 203 | 1.0 | — | 230 |
| First Magnetic Layer | 34 | 10.2 | — | 180 |
| Second Magnetic Layer | 132 | 0.6 | 200 | 280 |

Overwriting was conducted on the above magneto-optical recording medium No. 5 of the present invention, without the application of any magnetic field for initialization thereto under the following conditions:

| Laser power at recording: | 12 mW |
|---|---|
| Laser power at erasing: | 6 mW |
| Laser power at reproduction: | 1 mW |
| Line speed: | 7 m/s |

With respect to the bias magnetic field Hb, a magnetic field of 0.8 Koe which satisfied the previously mentioned formula (4) was applied in such a direction as shown in FIGS. 5(a) and 5(b).

The following Table 10 shows the C/N value when 1 MHz signals were recorded and reproduced under the above-mentioned conditions on the above recording medium, and the C/N value obtained when 2 MHz overwriting was performed on the recording medium:

TABLE 10

|  | C/N (Before Overwriting) | C/N (After Overwriting) |
|---|---|---|
| Example 5 | 49dB | 48dB |

The above results indicate that even when the light rare earth element Nd was contained in the reproduction layer, a higher C/N value and a better overwriting performance were obtained by the provision of the reproduction layer than those obtained by the magneto-optical recording medium No. 1 of the present invention fabricated in Example 1 which did not include the reproduction layer.

When such a light rare earth element as used in this example is used in the reproduction layer, the decrease in the magneto-optical effect is advantageously small even if the wavelength of the laser beam applied thereto is shortened.

EXAMPLE 6

The following layers were successively overlaid on a polycarbonate disk with a diameter of 130 mm serving as a substrate in vacuum by the rf magnetron sputtering method, whereby a magneto-optical recording medium No. 6 of the present invention was fabricated:

| | |
|---|---|
| Protective Layer 2: | Si$_3$N$_4$ (800 Å) |
| 1st Magnetic Layer 3: | Tb$_{0.21}$(Fe$_{0.9}$Co$_{0.1}$)$_{0.79}$ (500 Å) |
| 2nd Magnetic Layer 4: | (Gd$_{0.9}$Tb$_{0.1}$)$_{0.28}$(Fe$_{0.85}$Co$_{0.15}$)$_{0.72}$ (1200 Å) |
| Heat Conductive Layer 8: | Al (1000 Å) |
| Productive Layer 5: | Si$_3$N$_4$ (500 Å) |

The magnetic characteristics of the first magnetic layer, and the second magnetic layer of this magneto-optical recording medium were as shown in the following Table 11:

TABLE 11

| | Ms(emu/cc) | Hc(KOe) | Tcomp(°C.) | Tc(°C.) |
|---|---|---|---|---|
| First Magnetic Layer | 34 | 10.2 | — | 180 |
| Second Magnetic Layer | 132 | 0.6 | 200 | 280 |

Overwriting was conducted on the above magneto-optical recording medium No. 6 of the present invention, without the application of any magnetic field for initialization thereto under the following conditions:

| | |
|---|---|
| Laser power at recording: | 13 mW |
| Laser power at erasing: | 6 mW |
| Laser power at reproduction: | 1 mW |
| Line speed: | 7 m/s |

With respect to the bias magnetic field Hb, a magnetic field of 0.8 Koe which satisfied the previously mentioned formula (4) was applied in such a direction as shown in FIGS. 5(a) and 5(b).

The following Table 12 shows the C/N value when 1 MHz signals were recorded and reproduced under the above-mentioned conditions on the above recording medium, and the C/N value obtained when 2 MHz overwriting was performed on the recording medium:

TABLE 12

| | C/N (Before Overwriting) | C/N (After Overwriting) |
|---|---|---|
| Example 6 | 48dB | 47dB |

The above results indicate that when the heat conductive layer was provided, a higher C/N value and a better overwriting performance were obtained than those obtained by the magneto-optical recording medium No. 1 of the present invention fabricated in Example 1 which did not include the heat conductive layer.

Numerous additional modifications and variations of the present invention are possible in light of the above teachings by using the intermediate layer, the reproduction layer or the heat conductive layer in varous combinations. It is therefore to be understood that within the scope of the appended claims, the invention may be practiced otherwise than as specifically described herein.

According to the present invention, overwriting has become possible without the application of a magnetic field for initialization by a magneto-optical recording medium which comprises a first magnetic layer and a second magnetic layer, which are overlaid, each having a perpendicular magnetic anisotropy, and the first magnetic layer having a Curie temperature of Tc$_1$, a saturation magnetization of Ms$_1$, a coercive force of Hc$_1$, and a thickness of t$_1$, the second magnetic layer having a compensation temperature of Tcomp$_2$, a Curie temperature of Tc$_2$, and a coercive force of Hc$_2$, and which satisfies the relationships:

$$Troom < Tc_1 < Tcomp_2 < Tc_2$$

$$Hc_1 > Hc_2$$

$$Hc_1 > \sigma w / 2Ms_1 t_1$$

wherein Troom is room temperature, and $\sigma w$ is the interface wall energy between the first magnetic layer and the second magnetic layer.

The overwriting performance of the above magneto-optical recording medium can be improved by the provision of the previously mentioned intermediate layer between the first magnetic layer and the second magnetic layer.

Furthermore, the magneto-optical recording medium can provide excellent overwriting performance when each of the first magnetic layer and the second magnetic layer comprises an amorphous magnetic film of the formula:

$$[(RE1)_{1-z}(RE2)_z]_x(Fe_{1-y}Co_y)_{1-x}$$

wherein RE1 is at least one heavy rare earth element selected from the group consisting of Tb, Gd, Dy, Ho and Er, and RE2 is at least one light rare earth element selected from the group consisting of Ce, Pr, Nd, Pm, Sm and Eu, and $0.15 \leq x \leq 0.35$, $0 \leq y \leq 0.4$, $0 \leq z \leq 0.5$.

By adding a light rare earth element to the first magnetic layer or the second magnetic layer, the overwriting performance of the recording medium can be improved even when the wavelength of a light to be applied to the recording medium is shortened.

When a reproduction layer is provided adjacent to the first magnetic layer on a light-incident side thereof, the reproduction C/N ratio and overwriting performance of the recording medium can be further improved. By adding a light rare earth element to the reproduction layer, the overwriting performance of the recording medium can be improved even when the wavelength of a light to be applied to the recording medium is shortened. By providing a heat conductive layer adjacent to the second magnetic layer on a side opposite to a light-incident side thereof, the reproduction C/N ratio and overwriting performance of the recording medium can be further improved.

Furthermore, by use of the above-mentioned magneto-optical recording medium, overwriting can be performed without the application of a magnetic field for initialization of the recording medium by conducting the erasure of recorded information by raising the temperature thereof to a temperature near the Curie temperature Tc$_1$, and by recording information in the magneto-optical recording medium by raising the temperature thereof to a temperature near the Curie temperature Tc$_2$.

What is claimed is:

1. A magneto-optical recording medium which comprises:

a first magnetic layer and a second magnetic layer, which are overlaid, each having a perpendicular magnetic anisotropy, and said first magnetic layer having a Curie temperature of $Tc_1$, a saturation magnetization of $Ms_1$, a coercive force of $Hc_1$, and a thickness of $t_1$, said second magnetic layer having a compensation temperature of $Tcomp_2$, a Curie temperature $Tc_2$, and a coercive force of $Hc_2$, and which satisfies the relationships:

$Troom < Tc_1 < Tcomp_2 < Tc_2$ $Hc_1 > Hc_2$ $Hc_1 > \sigma w/2Ms_1 t_1$ wherein Troom is room temperature, and $\sigma w$ is the interface wall energy between said first magnetic layer and said second magnetic layer, and wherein each of said first magnetic layer and said second magnetic layer comprises an amorphous magnetic film of the formula:

$[(RE1)_{1-z}(RE2)_z]_x(Fe_{1-y}Co_y)_{1-x}$ wherein RE1 is at least one heavy rare earth element selected from the group consisting of Tb, Gd, Dy, Ho and Er, and RE2 is at least one light rare earth element selected from the group consisting of Ce, Pr, Nd, Pm, Sm, and Eu, and $0.15 \leq x \leq 0.35$, $0 \leq y \leq 0.4$, $0 \leq z \leq 0.5$.

2. A magneto-optical recording medium which comprises:
a first magnetic layer and a second magnetic layer, which are overlaid, each having a perpendicular magnetic anisotropy, and said first magnetic layer having a Curie temperature of $Tc_1$, a saturation magnetization of $Ms_1$, a coercive force of $Hc_1$, and a thickness of $t_1$, said second magnetic layer having a compensation temperature of $Tcomp_2$, a Curie temperature $Tc_2$, and a coercive force of $Hc_2$, and which satisfies the relationships:

$Troom < Tc_1 < Tcomp_2 < Tc_2$ $Hc_1 > Hc_2$ $Hc_1 > \sigma w/2Ms_1 t_1$ wherein Troom is room temperature, and $\sigma w$ is the interface wall energy between said first magnetic layer and said second magnetic layer, and
an intermediate layer between said first magnetic layer and said second magnetic layer, said intermediate layer being capable of adjusting the exchange coupling force between said first magnetic layer and said second magnetic layer,
wherein each of said first magnetic layer and said second magnetic layer comprises an amorphous magnetic film of formula (I):

$[(RE1)_{1-z}(RE2)_z]_x(Fe_{1-y}Co_y)_{1-x}$ (I)

wherein RE1 is at least one heavy rare earth element selected from the group consisting of Tb, Gd, Dy, Ho and Er, RE2 is at least one light rare earth element selected from the group consisting of Ce, Pr, Nd, Pm, Sm and Eu, and $0.15 \leq x \leq 0.35$, $0 \leq y \leq 0.4$, $0 \leq z \leq 0.5$.

3. A magneto-optical recording medium which comprises:
a first magnetic layer and a second magnetic layer, which are overlaid, each having a perpendicular magnetic anisotropy, and said first magnetic layer having a Curie temperature of $Tc_1$, a saturation magnetization of $Ms_1$, a coercive force of $Hc_1$, and a thickness of $t_1$, said second magnetic layer having a compensation temperature of $Tcomp_2$, a Curie temperature $Tc_2$, and a coercive force of $Hc_2$, and which satisfies the relationships:

$Troom < Tc_1 < Tcomp_2 Tc_2$ $Hc_1 > Hc_2$ $Hc_1 > \sigma w/2Ms_1 t_1$ wherein Troom is room temperature, and $\sigma w$ is the interface wall energy between said first magnetic layer and said second magnetic layer,
further comprising a reproduction layer, which is provided adjacent to said first magnetic layer on a light-incident side thereof, and comprises an amorphous magnetic layer of formula (II) having perpendicular magnetic anisotropy, a coercive force smaller than that of said first magnetic layer, and a Curie temperature higher than that of said first magnetic layer, $[(RE3)_{1-c}(RE4)_c]_a(Fe_{1-b}Co_b)_{1-a}$ (II)

wherein RE3 is at least one heavy rare earth element selected from the group consisting of Tb, Gd, Dy, Ho and Er, RE4 is at least one light rare earth element selected from the group consisting of Ce, Pr, Nd, Pm, Sm and Eu, and $0.15 \leq a \leq 0.35$, $0 \leq b \leq 0.4$, $0 \leq c \leq 0.5$.

4. A magneto-optical recording medium which comprises:
a first magnetic layer and a second magnetic layer, which are overlaid, each having a perpendicular magnetic anisotropy, and said first magnetic layer having a Curie temperature of $Tc_1$, a saturation magnetization of $Ms_1$, a coercive force of $Hc_1$, and a thickness of $t_1$, said second magnetic layer having a compensation temperature of $Tcomp_2$, a Curie temperature $Tc_2$, and a coercive force of $Hc_2$, and which satisfies the relationships:

$Troom < Tc_1 < Tcomp_2 < Tc_2$ $Hc_1 > Hc_2$ $Hc_1 > \sigma w/2Ms_1 t_1$ wherein Troom is room temperature, and $\sigma w$ is the interface wall energy between said first magnetic layer and said second magnetic layer, and
an intermediate layer between said first magnetic layer and said second magnetic layer, said intermediate layer being capable of adjusting the exchange coupling force between said first magnetic layer and said second magnetic layer.
further comprising a reproduction layer, which is provided adjacent to said first magnetic layer on a light-incident side thereof, and comprises an amorphous magnetic layer of formula (II) having perpendicular magnetic anisotropy, a coercive force smaller than that of said first magnetic layer, and a Curie temperature higher than that of said first magnetic layer, $$[(RE3)_{1-c}(RE4)_c]_a(Fe_{1-b}Co_b)_{1-a} \quad (II)$$

wherein RE3 is at least one heavy rare earth element selected from the group consisting of Tb, Gd, Dy, Ho and Er, RE4 is at least one light rare earth element selected from the group consisting of Ce, Pr, Nd, Pm, Sm and Eu, and $0.15 \leq a \leq 0.35$, $0 \leq b \leq 0.4$, $0 \leq c \leq 0.5$.

5. The magneto-optical recording medium as claimed in claim 1, further comprising a reproduction layer, which is provided adjacent to said first magnetic layer on a light-incident side thereof, and comprises an amorphous magnetic layer of formula (II) having perpendicular magnetic anisotropy, a coercive force smaller than that of said first magnetic layer, and a Curie temperature higher than that of said first magnetic layer, $$[(RE3)_{1-c}(RE4)_c]_a(Fe_{1-b}Co_b)_{1-a} \quad (II)$$

wherein RE3 is at least one heavy rare earth element selected from the group consisting of Tb, Gd, Dy, Ho and Er, RE4 is at least one light rare earth element selected from the group consisting of Ce, Pr, Nd, Pm, Sm and Eu, and $0.15 \leq a \leq 0.35$, $0 \leq b \leq 0.4$, $0 \leq c \leq 0.5$.

6. The magneto-optical recording medium as claimed in claim 1, further comprising a heat conductive layer adjacent to said second magnetic layer on a side opposite to a light-incident side thereof.

7. The magneto-optical recording medium as claimed in claim 3, further comprising a heat conductive layer adjacent to said second magnetic layer on a side opposite to a light-incident side thereof.

8. A magneto-optical recording medium which comprises:
a first magnetic layer and a second magnetic layer, which are overlaid, each having a perpendicular magnetic anisotropy, and said first magnetic layer having a Curie temperature of $Tc_1$, a saturation magnetization of $Ms_1$, a coercive force of $Hc_1$, and a thickness of $t_1$, said second magnetic layer having a compensation temperature of $Tcomp_2$, a Curie temperature $Tc_2$, and a coercive force of $Hc_2$, and which satisfies the relationships:

$Troom < Tc_1 < Tcomp_2 < Tc_2$ $Hc_1 > Hc_2$ $Hc_1 > \sigma w / 2Ms_1 t_1$ wherein Troom is room temperature, and $\sigma w$ is the interface wall energy between said first magnetic layer and said second magnetic layer,
further comprising a heat conductive layer adjacent to said second magnetic layer on a side opposite to a light-incident side thereof,
wherein each of said first magnetic layer and said second magnetic layer comprises an amorphous magnetic film of formula (I):

$$[(RE1)_{1-z}(RE2)_z]_x(Fe_{1-y}Co_y)_{1-x} \quad (I)$$

wherein RE1 is at least one heavy rare earth element selected from the group consisting of Tb, Gd, Dy, Ho and Er, RE2 is at least one light rare earth element selected from the group consisting of Ce, Pr, Nd, Pm, Sm and Eu, and $0.15 \leq x \leq 0.35$, $0 \leq y \leq 0.4$, $0 \leq z \leq 0.5$.

* * * * *